United States Patent [19]
Elliott, Jr.

[11] Patent Number: 5,555,735
[45] Date of Patent: Sep. 17, 1996

[54] REMOVAL OF VOLATILE ORGANIC POLLUTANTS FROM DRINKING WATER

[76] Inventor: Robert H. Elliott, Jr., 6027 Cannon Hill Rd., Fort Washington, Pa. 19034

[21] Appl. No.: 543,755

[22] Filed: Oct. 16, 1995

Related U.S. Application Data

[63] Continuation of Ser. No. 353,184, Dec. 9, 1994, Pat. No. 5,458,184, which is a continuation-in-part of Ser. No. 88,671, Jul. 7, 1993, Pat. No. 5,372,012, which is a continuation-in-part of Ser. No. 894,941, Jun. 8, 1992, abandoned, which is a continuation-in-part of Ser. No. 693,565, Apr. 30, 1991, Pat. No. 5,152,150, which is a continuation of Ser. No. 581,676, Sep. 13, 1990, abandoned, which is a continuation of Ser. No. 395,568, Aug. 18, 1989, abandoned.

[51] Int. Cl.$^6$ ..................................................... F25B 19/00
[52] U.S. Cl. ............................................. 62/100; 203/11
[58] Field of Search .......................... 62/100, 268; 203/11

[56] References Cited

U.S. PATENT DOCUMENTS

| | | | |
|---|---|---|---|
| 2,121,281 | 6/1938 | Bosque | 62/338 X |
| 2,274,409 | 2/1942 | Harbison | 62/338 |
| 2,358,559 | 9/1944 | Clemens | 203/11 X |
| 3,208,641 | 9/1965 | Brugioni | 62/338 |
| 4,366,030 | 12/1982 | Anderson | 203/11 |
| 4,848,748 | 6/1989 | Agnihotri et al. | 203/11 X |

*Primary Examiner*—William E. Tapolcai

[57] ABSTRACT

Volatile, toxic organic pollutants are removed from drinking water by partially filling a container with water and drawing a vacuum in the space above the water so that the pollutants exit the water into the space above the water for subsequent dispersement into the atmosphere.

4 Claims, 2 Drawing Sheets

REMOVAL OF VOLATILE ORGANIC POLLUTANTS FROM DRINKING WATER

This application is a continuation of application Ser. No. 08/353,184 filed Dec. 9, 1994, now U.S. Pat. No. 5,458,184 which is a CIP of application 08/088,671 filed Jul. 7, 1993, now U.S. Pat. No. 5,372,012 which was a CIP of application Ser. No. 894,941 filed Jun. 8, 1992 (now abandoned) which was a CIP of application Ser. No. 693,565 filed Apr. 30, 1991 (now U.S. Pat. No. 5,152,150) which was a continuation of application Ser. No. 581,676 filed Sep. 13, 1990 (now abandoned) which was a continuation of Ser. No. 395,568 filed Aug. 18, 1989 (now abandoned).

This invention relates to health care and especially to prevention of the ingestion of toxic organic carcinogens. More particularly, the invention relates to method for the removal of volatile toxic organic carcinogens from drinking water. The invention contemplates the use of standard conventional equipment for carrying out the methods whereby removal can be effected simply and inexpensively at home with water from the tap or with water from commercially purchased bottled water.

Figure 1:
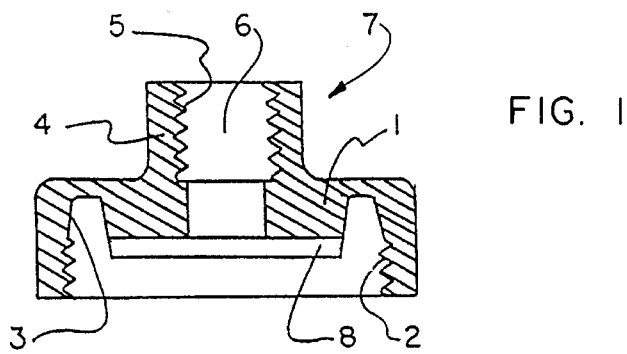
Figure 2:
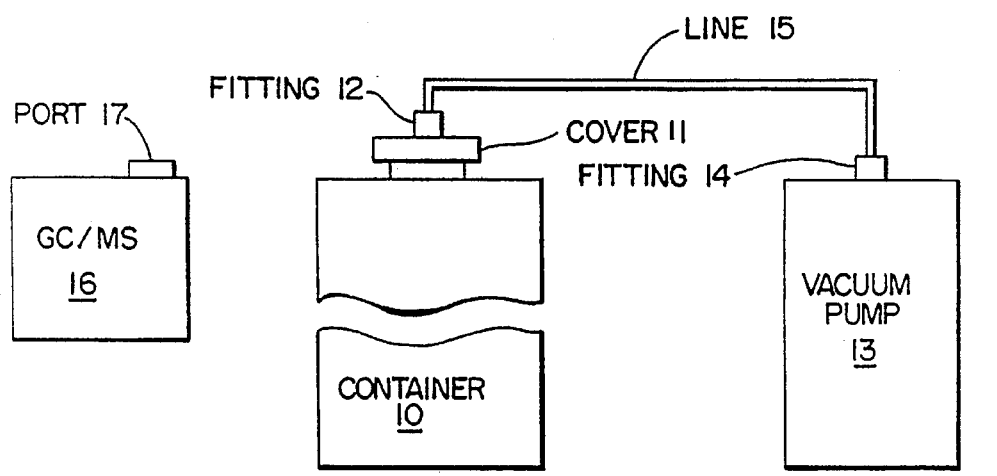
Figure 3:
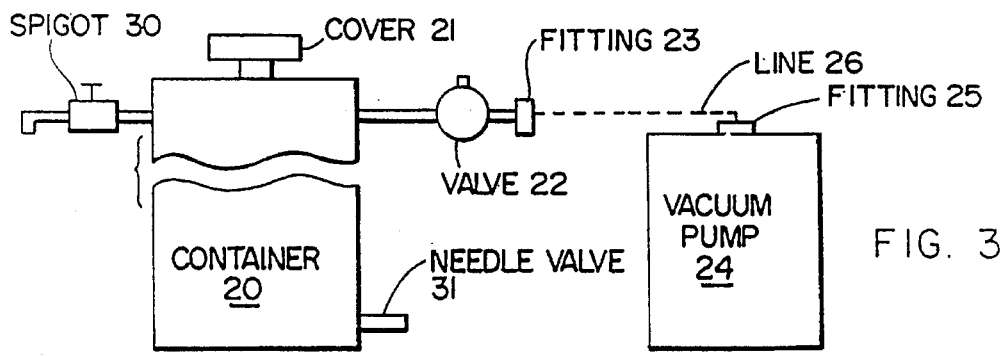
Figure 4:
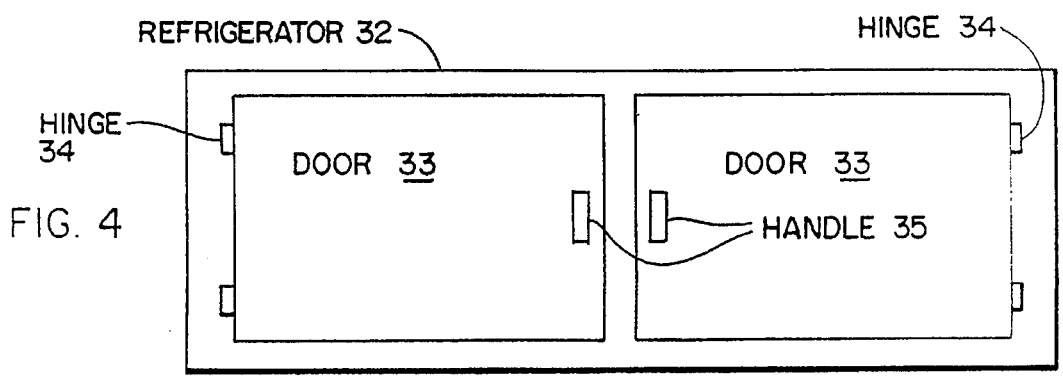
Figure 5:
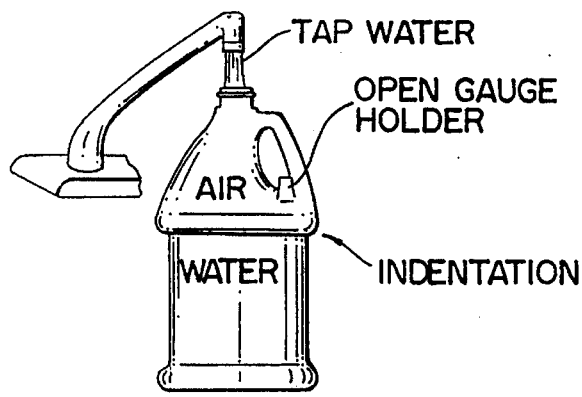
Figure 8:
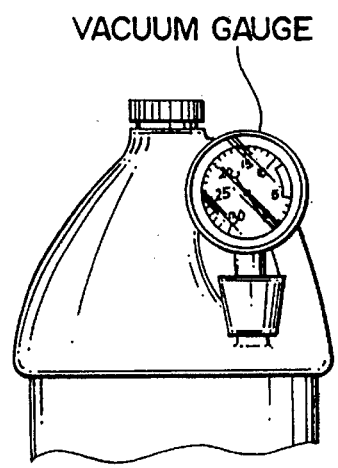
Figure 6:
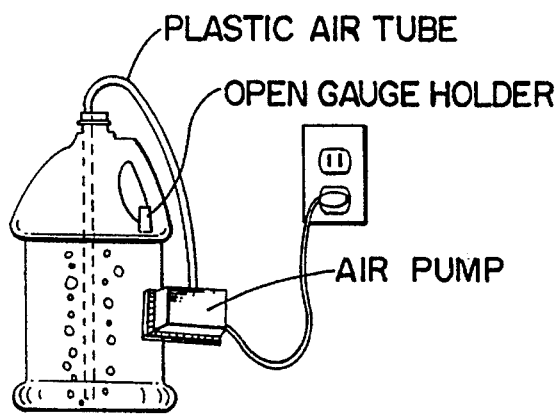
Figure 9:
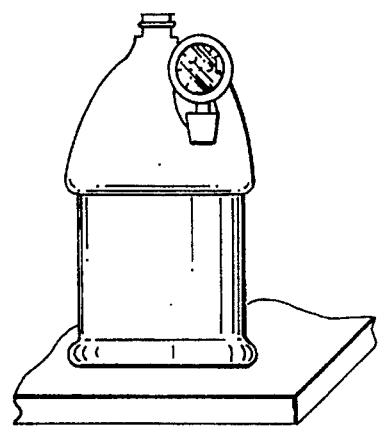
Figure 7:
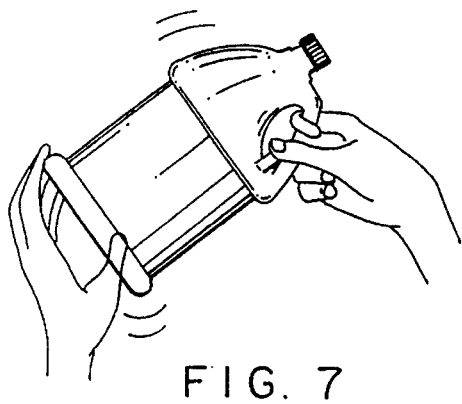
Figure 10:
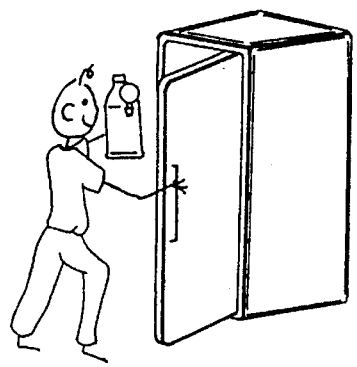

FIG. 1 is an elevational view partially in section illustrating an especially designed cap;

FIGS. 2, 3, and 4 are flow type diagrams illustrating equipment for practicing the invention; and FIG. 5 through 10 are views depicting the steps of an alternative method.

The potable water in the United States has been increasing in organic pollutants since the early fifties. The Environmental Protection Agency was formed in 1972 and they have found several hundred toxic organics in our drinking water, which are called TTOs or total toxic organics. Many companies have tried to make purifiers for the home owners to remove various pollutants.

Ion exchange units were introduced on the market, but only removed metals. The systems were beneficial with respect to removal of sodium for heart patients but at the same time removed calcium which is essential to good health. Another alarming attribute was that if ion exchange resin was swallowed, it could cause liver cancer and the resin did nothing for the removal of the TTOs, which are considered the most important aspect of the problem. Charcoal will absorb the toxic organics, but the removal capacity is so limited that the unit must be kept off the main stream of the water and used only for drinking water. This criteria is also the downfall of such a system. I have found that a charcoal unit guaranteed for five years gave off more TTOs than it removed after six months of operation.

For illustration, the incoming stream contained 2 parts per billion (ppb) of methylene chloride, 1 ppb of trichlorethylene and 3 ppb of chloroform. After going through the charcoal and very fine filter, the answer was surprising.

| | |
|---|---|
| Methylene chloride | 6.3 parts per billion |
| Trichloroethylene (TCE) | 2.7 parts per billion |
| Chloroform | 4.5 parts per billion |

A good quality filter was used to stop any possible fragments of charcoal getting through. The instrument to measure these toxic organics is a GC/MS, which stands for gas chromatograph with mass spectroscopy detection. Various other detectors can be used in place of the mass spectroscopy. The normal sensitivity is 0.5 parts per billion for the chlorinated compounds.

The above tests were tried under varying conditions and it seemed the charcoal loaded up very quickly. A scientist in Washington wrote an article on this phenomenon, which he called the wave effect. Even if the carbon was not saturated, the idle water surrounding the absorbing bed would become saturated with the various pollutants. When flushed the water that was supposed to be safe, was now more polluted than the original. Flushing for one minute or maybe two minutes might clear the charcoal bed, but who wants to play Russian roulette with cancer.

People want a positive answer when it comes to removal of cancer causing agents or carcinogens from their drinking water. Taking a quart or two from an ordinary tap and boiling the water will remove the volatile compounds, such as methylene chloride TCE and chloroform. Unfortunately, the water tastes bad, the process uses energy and the process is awkward and time consuming.

I have found a simpler way to remove the pollutants, Add 1½ quarts of tap water to a glass jar so that it is ¾ full and leave it out overnight on the counter so that the water assumes the room temperature. Tap the bottle and screw the cap on tightly and place in the refrigerator for at least eight hours. The drop in temperature will cause a vacuum in the glass bottle and pull the carcinogens out of the water. Heating the glass bottle slightly (150° F.) will create a better vacuum. The foregoing may be accomplished by any conventional method.

Illustration 1

| | | |
|---|---|---|
| Boston tap water | 4.5 ppb | TCE |
| After vacuum | not detected | (less than .5 ppb) |
| Philadelphia tap water | 30 ppb | chloroform |
| | 6 ppb | methylene chloride |
| | 1.4 ppb | TCE |
| After vacuum | not detected | (less than .5 ppb) |
| Orlando, FL tap water | 3.1 ppb | TCE |
| | 1.8 ppb | chloroform |
| After vacuum | not detected | (less than .5 ppb) |

Illustration 2

I gave the instructions to a local water company. After several days they called and said the process did not work. Further investigation revealed that they pulled a vacuum with a pump for only ten minutes and the results were

| | | |
|---|---|---|
| Water company | 2.1 ppb | chloroform |
| After vacuum (10 Min.) | 2.0 ppb | |

After trying many combinations, it appeared that five hours were needed to bring the chloroform down to the detection limit.

| | | |
|---|---|---|
| Water company sample | 2.1 ppb | chloroform |
| After vacuum | .5 ppb | chloroform |

It appears that it is important to lower temperature and pressure together and slowly.

| | | |
|---|---|---|
| Water company sample | 35° F. | 2.1 chloroform |
| After vacuum 8 hours | 35° F. | No detection |

Some research was devoted to placing a vacuum pump in a refrigerator and this proved successful but very expensive. A bottle and vacuum gauge would be less than $25.00 whereas a vacuum pump would be over $500.00. On a mass production basis the costs would be greatly reduced and the TTOs vented outside the refrigerator.

In recent months I have asked a number of people to try a set of bottles with vacuum gauge and without it. They definitely wanted the vacuum gauge. It was found the sealing ability of the screw caps was soon lost and the possibility of preventing cancer by the removal of the carcinogens was too important to fool with. A positive measure of the vacuum in the bottle was essential.

The problem of losing the vacuum after 20–30 turns was solved by using a specially designed cap. While I am not ruling out the possibility of using metal caps, it appeared likely a plastic cap would hold up for 1000 openings and closings. There was less chance of an off-taste with plastic caps. Many testers remarked that the water tasted better than bottled water.

This prompted me to check several different bottled waters.

| BOTTLED WATER NON CARBONATED | | |
| --- | --- | --- |
| Sample A | chloroform | 17.4 ppb. |
|  | carbon tetrachloride | 2.1 ppb. |
| Sample B | methylene chloride | 3.9 ppb. |
|  | toluene | .6 ppb. |
| Sample C | methylene chloride | 4.6 ppb. |
|  | bromodichloromethane | 2.1 ppb. |
|  | 1,1,1-trichloromethane | 1.8 ppb. |
|  | chloroform | 1.7 ppb. |

Pulling a vacuum by cooling in a refrigerator overnight proved to lower all carcinogens below the detection point.

With respect to the above mentioned specially designed cap, a typical cap is illustrated in FIG. 1. The cap has a body 1 lower internal threads 2, a cavity 3 designed to accept the tops of the neck of a water bottle or container, a neck 4 having internal threads 5 and opening 6. The neck 4 and threads 5 constitute a fitting 7 to which can be attached the stem of vacuum gauge on a vacuum pump.

The annular lip 8 extends down into the bottle or container and when the cap or cover is tightened down it measurably enhances the seal.

The container referred to above can be formed from glass or plastic provided the material has the rigidity to withstand vacuum. If cap is to be molded from plastic I prefer polypropylene.

It will be appreciated that a vacuum gauge or a vacuum pump can easily secured to the fitting 7. Naturally, the fitting can be plugged up in the event a vacuum gauge is not desired and/or the vacuum is not to be created by a pump.

I have referred to the components for removing the pollutants as conventional and standard. This is true of the GC/MS equipment even though this equipment is not ordinarily available in a dwelling. With respect to GC/MS equipment it is contemplated that the container for water and it's cap or cover be precalibrated.

If the container and cap are to be used with a vacuum pump, information on the vacuum level and the time under vacuum for desired removal are provided. Normally this will be 6–7 inches of mercury held for about 8 hours.

If the container (with cap or cover) is to be set up in a refrigerator for the vacuum creation, information on the desired refrigerator temperature and the time to be spent in the refrigerator for desired removal are provided.

With respect to time and temperature the following chart will provide a guide.

| Inches of Mercury | Time(hours) | Temp(°F.) |
| --- | --- | --- |
| 4 | 48 | 35 |
| 5 | 24 | 35 |
| 6 | 10 | 35 |
| 7 | 8 | 35 |

With respect to the testing time period with GC/MS equipment the following is to be noted.

When a container is taken from the refrigerator and a sample removed and tested in the GC/MS equipment it will be necessary to return the container to the refrigerator if the reading is more than ½ part per billion. Before returning the container to the refrigerator, water should assume room temperature. This may be done by leaving the container out of the refrigerator overnight.

With the methods herein note that the volatile pollutants in the space above the water are dispersed into the atmosphere when the container cover is removed. This is not detrimental in as much as the density in the atmosphere is negligible as compared to the density in the water.

As will be understood, the above described arrangements for drawing a vacuum by a pump each contemplate (like the version of drawing the vacuum by refrigeration) that water be obtained from the container by removing the cap.

In the event it is desired to obtain water via a spigot on the bottom of the container, a valve should be secured to the cap (say fitting 7) which can be activated to open the space above the water in the container to the atmosphere and thereby break the vacuum. After the water is drawn off, the valve can be activated to seal the space and permit the vacuum to again be created.

The valve and the spigot can be operated in coordination with one another, either manually or automatically.

In connection with the spigot/valve arrangement. I want to point out that there are vacuum pumps now available which can draw vacuums up to 30 in. of mercury and which are of a size and cost making same feasible to be used in my method. These pumps provide an additional advantage in that the same can be employed to purge the carcinogens in the space above the water. For such purposes, a needle valve is provided on the bottom of the container (near the spigot) which when opened will allow air to be pushed up thru the water and bubble out into the space. In the meantime the vacuum pump is activated to begin to evacuate the space. The foregoing is done over a short period of time and the needle valve closed and the vacuum pump stopped. The valve in the cap and the spigot both can be opened and water drawn off.

It will be understood that the just described spigot and valve arrangement can be employed in a refrigerator.

Further, it will be self-evident that automatic means can be provided for filing the container and light means can be employed with a vacuum gauge to indicate or alert that the desired vacuum has been reached.

In FIGS. 2, 3, and 4 I have provided sketches diagrammatically illustrating equipment for practicing the inventions as defined in claims 1–6.

In FIG. 1, the container 10 has a screw-on cover 11 with a fitting 12. The standard vacuum pump 13 has a fitting 14. The fittings 12 and 14 are connected by line 15.

The GC/MS equipment is indicated at 16 and has a port 17 into which water from the container 10 can be poured.

In FIG. 3, the container 20 has a screw on cover 21. A valve 22 is connected to the top interior of the container and has a fitting 23. The valve 22 is adapted to connect the interior of the container 20 either to the atmosphere or to fitting 23. The vacuum pump has a fitting 25. The fitting 23 and the fitting 25 can be connected by a line indicated by the dotted line 26.

Near the top, the container has a spigot 30 thru which water in the container can be emptied. Near the bottom the container has a controllable needle valve 31 (manually operated) in conjunction with the vacuum pump 24.

FIG. 4 illustrates a refrigerator 32, having doors 33 hinged at 34 and door opening handles 35.

The refrigerator is large enough to receive the container mentioned in connection with FIGS. 2 and 3.

I will now explain a simplified method for attaining the objectives of the invention.

Preferably, this is done by using an extra thick plastic bottle, filling with hot steaming water, tightly closing the bottle, allowing it to cool down in a room temperature environment for approximately two hours, and then placing in a refrigerator, such as a household refrigerator, and allow to cool for at least five hours. Usually, the bottle remains in the refrigerator overnight.

Hot steaming water has a temperature of substantially between 160°–200° F. At that temperature range, steam vapor rises from the surface.

As indicated heretofore, a household refrigerator will have a temperature range between 32° F. and 40° F.

The bottle or container must be constructed, when closed, to sustain an internal vacuum and to withstand the temperature range of hot steaming water. I have used high density polyethylene as the plastic material with a wall thickness in the side, bottom, and pouring throat of approximately 1/8 inch. This provides the necessary strength to prevent collapse under internal vacuum. A thicker wall may be used if desired.

The bottle or container is conveniently in the shape of a one gallon plastic milk bottle with the wall thickness as above indicated.

Normally, glass cannot be used as it would eventually fracture under thermal shock and if dropped on a hard surface when under vacuum it would blow up like a bomb.

I want to point out that the step of allowing the partially filled bottle to cool down in a room temperature environment can be eliminated and the bottle placed directly in the refrigerator.

The advantage of the two step method is that there is a saving in energy which is very important to the national energy saving programs. Also, the two step method is preferred because I believe more of the carcinogens are removed that in the one step method.

An alternative method is shown in FIGS. 5–10. The equipment needed for this alternative method includes: a plastic bottle of the kind referred to above but which additionally has an open gauge holder; a length of plastic tubing; an air pump; and a vacuum gauge. Below, with the reference to FIGS. 5–10 I will outline the alternative method.

1. Fill bottle to top indentation with hot tap water (135–145 degrees).

2. Insert air tube and aerate making sure the air tube goes to the bottom of the bottle. Remove after 10 minutes.

3. Put top on tight—Shake vigorously with finger over the open gauge holder. Stop to release air once or twice.

4. Shake again. Quickly place vacuum gauge over the open gauge holder.

5. Cool on counter for about 2 hours. Vacuum gauge should read about 2–3 inches.

6. Place in refrigerator for 5–8 hours. Vacuum gauge reading should be in the dark blue section (5–9 inches) after 5 hours in the refrigerator and be ready to drink.

Another alternative method particularly applicable as respects refrigerators is discussed below.

The United States Environmental Protection Agency prefers that the toxic organics in drinking water be called volatile organic compounds or V.O.C. Previously they were called T.T.O.s or total toxic organics. Limits of detection were in the order or one half to one part per billion. Our method of removal of the carcinogens (VOC) was always below these figures and after several years of research analytical answers in the order of 20–70 parts per trillion were obtainable.

We have found an interesting comparison between two plastic bottles at 150° F. which obtained a vacuum of ten inches. The first one was air swept for ten minutes and the other without air. I thought air bubbling might add carcinogens from the air but it was just the opposite. The air bubbled bottle showed less trichloroethylene (TCE) and less chloroform than the non-aerated bottle. While many other volatiles are present, TCE is the most common (1–5 ppb) and certainly one of the most potent carcinogens known to the human body. Chloroform is less toxic but is often present in the range of 20 to 180 ppb which places it at the highest level of any of the contaminants. Blank runs often show higher levels than the expected levels of our specific contaminate. For example, one laboratory would show 670 ppt chlorobenzene and a split sample with a second laboratory would show less than 50 ppt. Previously both results would have shown beyond the limits of detection. On the other hand, split samples of TCE showed the following:

|  | First lab | Second lab |
| --- | --- | --- |
| TCE, no bubbling | 170 ppt | 135 ppt |
| TCE, air bubbling, ten minutes | 95 ppt | 92 ppt |

These experiments suggested that perhaps the air space was too limited and the air space was increased from 25 percent to 40 percent with the following results. The temperature was maintained at 150° F. at the start of the vacuum and the vacuums ran 10±½" of mercury column.

|  | First lab | Second lab |
| --- | --- | --- |
| TCE, no bubbling | 47 ppt | 52 ppt |
| TCE, air bubbling | 58 ppt | 40 ppt |

If the blanks are subtracted from these figures in the first lab, the answers would be zero, but this is highly unlikely. In the second lab the answers averaged 20 parts per trillion. Experiments with chloroform showed higher levels as the starting concentration in the tap water was about 50 ppb and TCE was 2 ppb. Considerable decrease in the chloroform level was noticed by increasing the air space above the water from 25% to 40%. Still another experiment was run with 50% air space and 50% tap water and this seemed to be near perfection.

The temperature was increased to 160° F. and while results were lower, the plastic jugs began to deform. Stainless steel containers are bing considered and one was tried for automatic use built right into a refrigerator, but stainless would cost 20 times as much as plastic bottles. Under no circumstances should a glass bottle be used since it will implode if dropped or under continual heating and cooling.

Some of the above work was done to develop a continuous unit built right into a refrigerator or a separate purification water unit such as for a restaurant. A second purpose of this work was to eliminate the air bubbling and still obtain high quality water. Usually water out of the hot water tap is between 125°–135° F. Heating the water to 165° F. in a microwave oven has the further advantage of killing any microbes that might be in the drinking water. A number of people have died in recent years in major cities in the United States because public water works failed to kill all microbes.

By inserting a stainless unit in a refrigerator the bottle can be smaller with a required air space of only 5 percent. The water is heated to 150°–160° F. and a vacuum pump is turned on after the water chills down to 120° F. The pump continues until the temperature reaches 110° F. and an air sweep removes the carcinogens for 30 seconds. The air sweep valve is turned off and a 10 inch vacuum is maintained until the water reaches 35°–50° F. The purified water is pumped to a 1–5 gallon container, which is at normal atmospheric pressure. It takes about two hours to make a batch and the reactor can be 1, 2, 3, or 4 quarts and the unit will automatically shut down when the storage tank (1–5 gallons) is full. There is no limit on the size of the unit to deliver safe drinking water. Time in the reactor is only two hours compared with eight hours in the bottle method because the air sweep is drawn under vacuum. The readings in parts per trillion are slightly lower than the bottle method and has the further advantage of being fully automatic. It is difficult to ascertain the levels of various carcinogens below 50 parts per trillion and public water works and wells alike are showing increasing concentrations of cancer causing agents. In 1994 breast cancer became the leading site specific cause of death in women in the United States—about 200,000. Some scientists argue that DDT caused the surge in breast cancer, but DDT has not been used since 1966. Latency is typically 20 years, which would indicate in 1986 the incidence of this type of cancer would wane. However, it has done just the opposite and tripled approximately in the last eight years. If we strip away the two Ds from DDT we have TCA, a common carcinogen in our drinking water.

In 1993 the Zerpol Corporation removed a TCA vapor degreaser. TCA is 1,1,1 trichloroethane and this was the only material ever used in the vapor degreaser, but analysis of the sludge in the pit under the vapor degreaser showed two thirds TCE and one third TCA. Drinking water will commonly show 2–4 parts TCE and about one part per billion of TCA.

If pure TCE comes in contact with water or moisture, it forms TCA in a matter of hours at elevated temperatures. Inhibitors, such as various amines, slow down the reaction but the end results are the same and vice versa when starting with TCA.

The Environmental Protection Agency has tried to outlaw TCE and TCA but without success and yet DDT was outlawed. Chlorodane was outlawed. EPA could start by lowering the TTOs from 2.13 mg per liter (2130 ppb) to 10 ppb for industrial discharge of wastewater.

Before closing I want to point some additional facts.

It appears that there is a balance of the volatile organic compounds in the air space above the water which is effected by the ratio of water volume to air volume, temperature, amount of VOC in the water at the start, and inches of vacuum. If the vacuum is three inches at room temperature, it will remove most of the VOC in eight hours providing the carcinogens are between 10–50 parts per billion, whereas 10 inch vacuum will remove an equal amount in three hours elevating the temperature will reduce the time for removing the VOC from the water but only within certain limits in a confined space. Usually about 160° F. is the maximum efficiency. However, higher temperatures are effective if an air sweep is used under vacuum to rapidly remove the volatile organics from the container.

These concepts helped to develop a compact stainless steel unit for continuous service built into a home refrigerator. While stainless steel is the preferred construction other materials can be used and as polyethylene, aluminum, ceramics, or similar materials. The incoming water can be hot or cold, but hot is preferred to insure killing the bacteria such as from a well. The first container, preferably stainless, can be one quart to one gallon and the air space requirement is only 5–10 percent of the container. The reason for the small space is, while under vacuum, a timer open a valve at the bottom of the closed vessel and sucks in air due to the 10 inch vacuum. The aerator is designed to produce very small bubbles which remove the carcinogens much faster. Only two hours are required. The temperature may be adjusted at the start to 200° F. to kill microbes, but the temperature should be down to 35° to 50° F. at the finish. Ideally the aerator should run for 10 minutes when the temperature is between 140° F.–150° F. and a vacuum of 10–15 inches.

The second container should be between two and five gallons and is usually made of polyethylene. Buyer of the refrigerator should have a choice of size. For example, a family of five would use four gallon reservoir would be adequate with a two quart reactor feeding the storage tank every two hours. The unit will automatically shut down when full. All temperature are adjustable as well as vacuum and times.

There is no limit on the size of the water purifier units to deliver safe drinking water whether it is in a refrigerator, single unit for restaurants, and large manufacturing plant.

I claim:

1. The method of removing volatile, toxic substances from drinking water comprising the steps of:

providing a container which can be opened and closed and which is constructed, when closed, to contain water and to sustain an internal vacuum and also constructed with a passageway configured to receive and support the rubber stopper of a vacuum gauge;

opening said container and partially filling the container with drinking water having a temperature range of approximately 135–145 degrees F.;

aerating said water for not over 10 minutes;

closing off said container and placing said rubber stopper in said passageway;

storing said container and the vacuum gauge thereon substantially at room temperature until the vacuum gauge shows approximately 2–3 inches of mercury; and placing the container with vacuum gauge showing approximately 2–3 inches of mercury in a refrigerator to permit the vacuum gauge to show approximately 4–9 inches of mercury.

2. The method of removing volatile, toxic substances from drinking water comprising the steps of:

providing (a) a vacuum gauge with a rubber stopper and (b) a plastic container having an opening covered with a removable cap by which the container can be opened and closed and a passageway adapted to receive the rubber stopper of the vacuum gauge;

removing said cap and partially filling said container with hot drinking water;

replacing said cap and while closing off said passageway shaking said container and stopping the shaking at least once and release air;

after said shaking, immediately placing the vacuum gauge stopper in said vacuum gauge passageway;

storing said container substantially at room temperature with the vacuum gauge thereon until the vacuum gauge shows approximately 2–3 inches of mercury; and placing said container and vacuum gauge showing approximately 2–3 inches of mercury in a refrigerator to permit the vacuum gauge to show approximately 4–9 inches of mercury.

3. The method of claim 2 wherein said hot drinking water has a temperature range of approximately 135–145 degrees F.

4. The method of removing volatile, toxic substances from drinking water comprising the steps of:

providing (a) a vacuum gauge with a rubber stopper; (b) a length of plastic tubing, (c) an air pump; and (d) a plastic container having an opening covered with a removable cap by which the container can be opened and closed and a passageway configured to receive and hold the rubber stopper of a vacuum gauge;

removing said cap and partially filling said container with drinking water having a temperature range between approximately 135–145 degrees F.;

placing said tubing through said opening with one end adjacent the bottom of the container and connecting the other end to said air pump and aerating said water for a period of not more than approximately 10 minutes;

removing said tubing and replacing said cap and while closing off said passageway shake container and stopping at least once to release air;

after said shaking, immediately placing said vacuum gauge stopper in said vacuum gauge passageway;

storing said container with the vacuum gauge thereon substantially at room temperature until the vacuum gauge shows approximately 2–3 inches of mercury; and placing said container with the vacuum gauge thereon and showing approximately 2–3 inches of mercury in a refrigerator to permit the vacuum gauge to show approximately 5–9 inches of mercury.

\* \* \* \* \*